United States Patent
Treuhaft et al.

[11] 3,918,944
[45] Nov. 11, 1975

[54] LEAD TRAP

[75] Inventors: Martin B. Treuhaft; Charles D. Wood, III, both of San Antonio, Tex.

[73] Assignee: PPG Industries, Inc., Pittsburgh, Pa.

[22] Filed: July 16, 1974

[21] Appl. No.: 489,951

Related U.S. Application Data

[62] Division of Ser. No. 192,846, Oct. 27, 1971.

[52] U.S. Cl. .......... 55/337; 55/498; 55/459; 55/414; 55/524; 55/527; 55/DIG. 30; 60/311
[51] Int. Cl.² .......... B01D 50/00
[58] Field of Search ........ 55/DIG. 30, 337, 97, 498, 55/414, 524, 527, 528, 521, 459; 60/311, 297, 299

[56] References Cited
UNITED STATES PATENTS

| | | | |
|---|---|---|---|
| 2,731,102 | 1/1956 | James | 55/337 |
| 2,826,265 | 3/1958 | DeWoody | 55/279 |
| 3,382,650 | 5/1968 | Peteri | 55/527 |
| 3,397,034 | 8/1968 | Tulleners | 55/337 |
| 3,421,315 | 1/1969 | Aoi | 55/DIG. 30 |
| 3,502,171 | 3/1970 | Cowan | 55/527 |
| 3,633,343 | 1/1972 | Mark | 55/337 |
| 3,688,476 | 9/1972 | Lenane | 55/276 |
| 3,712,029 | 1/1973 | Charlton | 55/DIG. 30 |
| 3,716,967 | 2/1973 | Doyle, Jr. et al. | 55/337 |

FOREIGN PATENTS OR APPLICATIONS

| | | | |
|---|---|---|---|
| 761,710 | 11/1956 | United Kingdom | 55/337 |

*Primary Examiner*—Bernard Nozick
*Attorney, Agent, or Firm*—John E. Curley; Robert DeMajistre

[57] ABSTRACT

An apparatus for treating automotive exhaust gases is described involving the utilization of an inertia type centrifugal separator and a fiber glass filter in series. The inertia separator is housed with the filter in a unitary housing in one embodiment and in a second embodiment is shown housed separate from the filter. The filter employed involves pleated fiber glass mat having a high temperature binder on the fiber glass used to insure its stability at the gas temperatures encountered.

4 Claims, 5 Drawing Figures

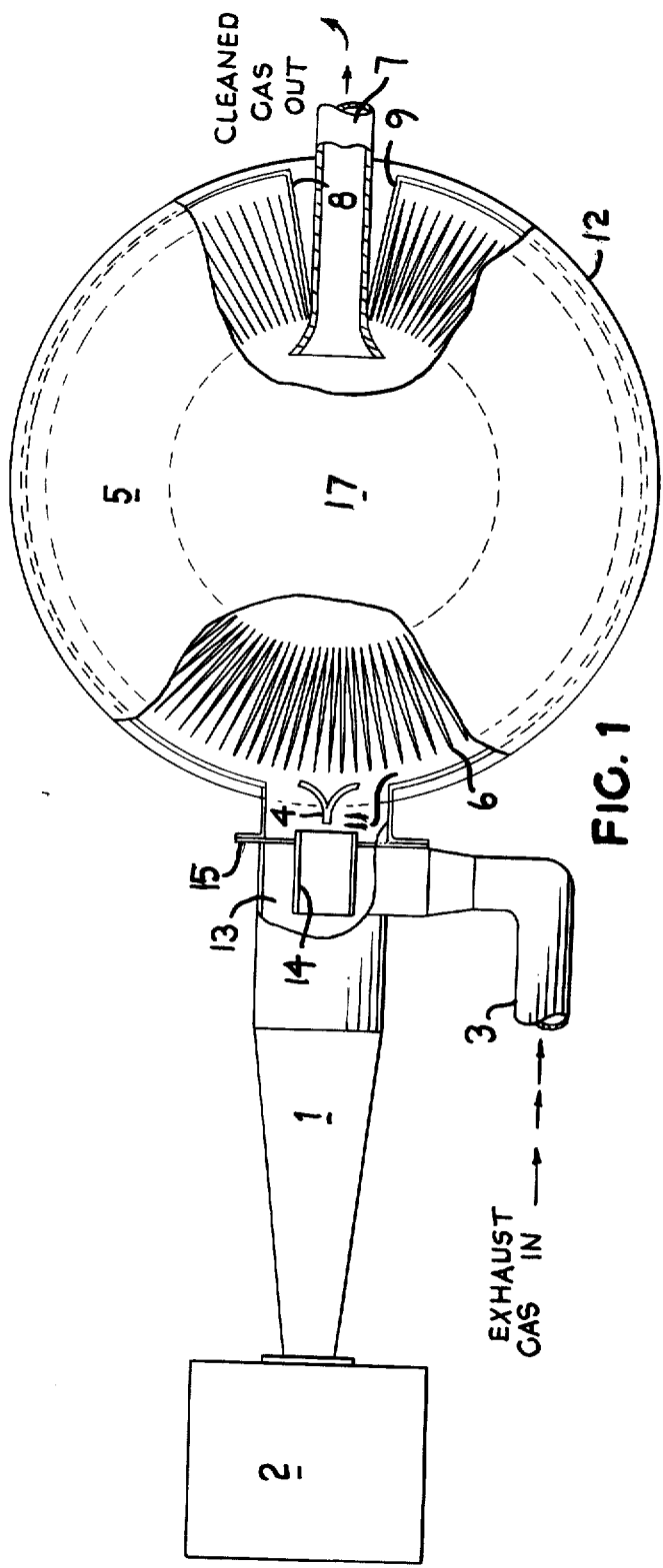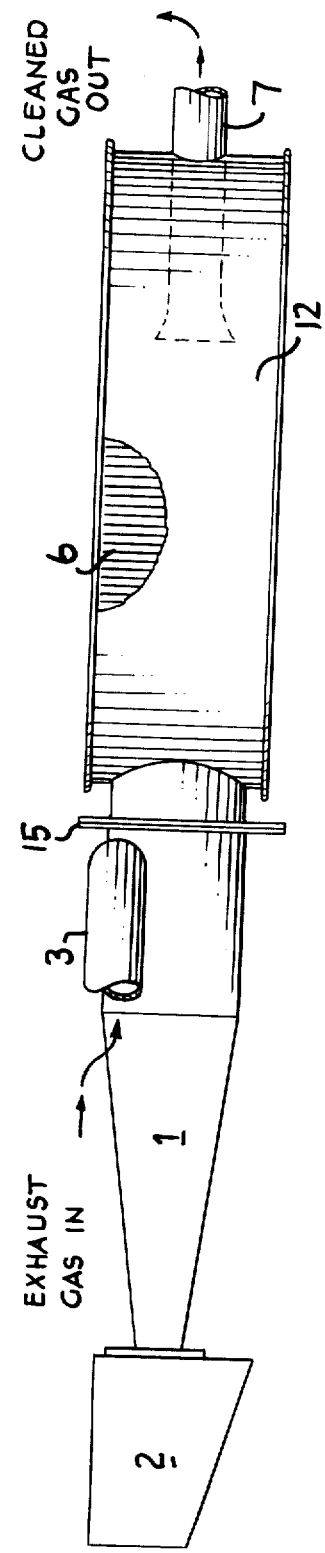

LEAD TRAP

This is a division of application Ser. No. 192,846, filed Oct. 27, 1971.

BACKGROUND OF THE INVENTION

Much concern has been expressed by federal and state governments as well as by industry in recent years in solving the problems of atmospheric pollution by the exhaust gas emissions of internal combustion engines and in particular the emissions in automobile exhaust gases. These emissions on a volume basis are primarily gases such as oxides of carbon, nitrogen oxides and unburned hydrocarbons. In addition the use of leaded fuels in gasoline contributes lead particulates to automotive exhaust gases and the presence of these particulates in automotive exhaust gas have also become a matter of considerable concern by both industry and government. The concern of government appears to center on the question of whether or not these particulate lead emissions represent a health hazard; a question still apparently unresolved. The concern of industry over these particulates centers on their effect on catalytic muffler systems designed to reduce the gaseous emissions such as hydrocarbons, carbon monoxide and nitrogen oxide.

One obvious solution to the problem of lead particulate emissions is the remomval of lead from gasoline. This has already resulted in legislation on state and federal levels limiting the quantities of lead in gasoline. Because of the unique nature of lead in gasoline and its beneficial properties in increasing gasoline octane values, its removal necessitates further refining of normal gasoline to produce gasolines with low lead that have adequate octane ratings for automotive use. The further processing of gasoline to compensate for lost lead tends to increase the price of gasoline and also results in a depletion of petroleum feed stocks, neither of these being desirable. Thus, an effective method of permitting leaded gasoline to continue to be used while eliminating lead particulate emissions is desirable so that low cost, high octane gasoline can still be utilized in automotive systems. Such a method will benefit the petroleum industry in that fuel reserves will not be reduced by producing super refined gasolines needed to supplant current high octane leaded fuels.

THE PRESENT INVENTION

In accordance with the instant invention, an apparatus for treating exhaust gases and apparatus for this purpose have been provided which effectively remove particulate lead from the exhaust gases of internal combustion engines and automobile exhausts in particular. The apparatus for the instant invention involves passing the exhaust gases at controlled temperature conditions through an inertial separator followed by the treatment of the gases leaving the separator in a final filtering element which is absolute in filtering characteristics, i.e., it will filter all particulates passed to it that are 0.3 micron or larger. The filter itself is a fiber glass mat or paper having a binder associated therewith permitting the filter to operate at elevated temperature.

The invention will be more readily understood with reference to the accompanying drawings in which:

FIG. 1 is a plan view of the filter and inertial separation system with the filter housing and a portion of the inertial separator housing broken away to show internal gas passages;

FIG. 2 is a side view of the filter and inertial gas separator of FIG. 1;

Figure 3:
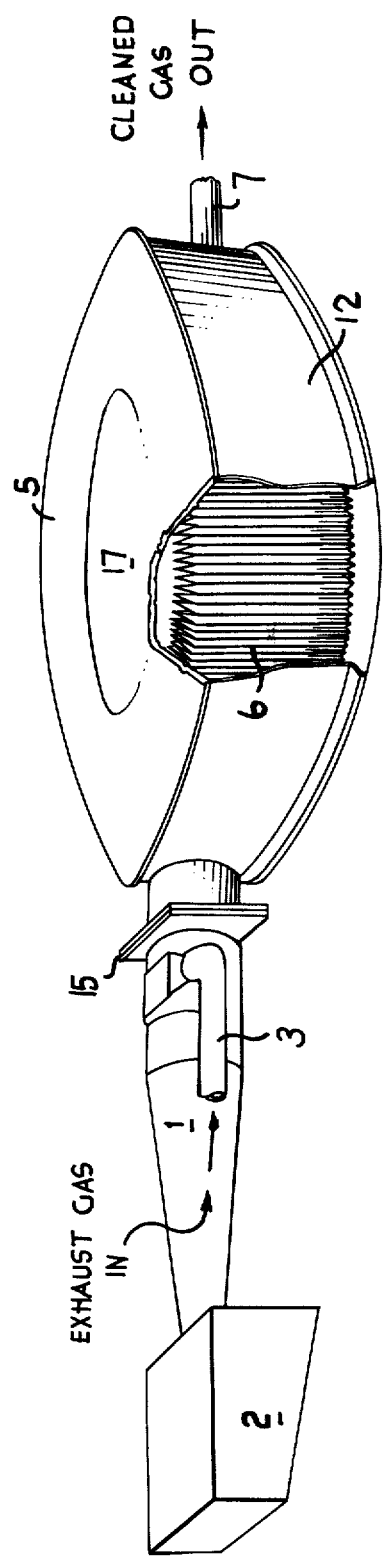
FIG. 3 is a view in perspective of the filter and inertial separator of FIG. 1.

As shown in FIGS. 1, 2 and 3, the particulate trap system of the instant invention involves in series an initial separator 1, equipped with a collector 2. The separator 1 in FIGS. 1, 2 and 3 is shown as a cyclone for convenience though recourse to other inertial type separators is contemplated without departing from the spirit of the instant invention as will be hereinafter more fully explained.

The exhaust gas inlet to the cyclone 1 is shown at 3. A baffle member 4 is shown at the entrance to the filter area generally indicated at 5. The filter 6 is shown as being of circular configuration though it will be understood that other geometric configurations can be employed. The filter 6 is a fiber glass mat or paper constituted of a continuous band of fiber glass, convoluted to increase the effective filtering surface area. An exit exhaust gas line 7 is provided which is positioned such that one open end is located behind the interior of the mat or paper 6 provided therein by the internal end of the mat or paper 6. A second gas space 11 is provided between the wall 12 of the filter 5 and the outer circular surface of the mat or paper 6.

Figure 4:
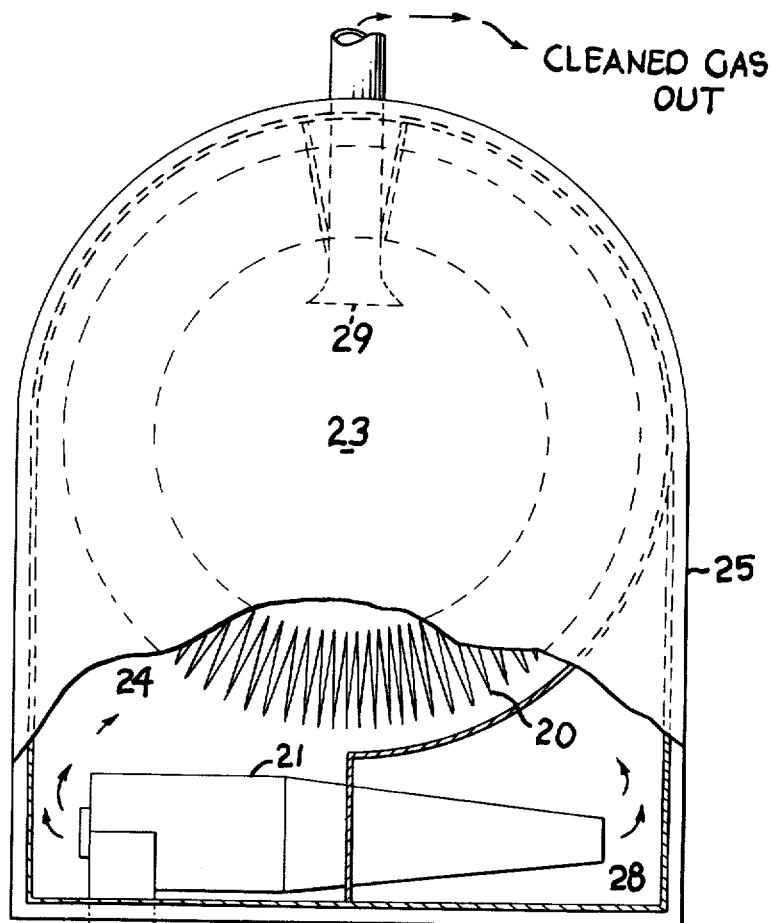
FIG. 4 is a plan view of another embodiment of the filter and inertial separator of the instant invention partially broken away to show the filter internals and gas passages.
Figure 5:
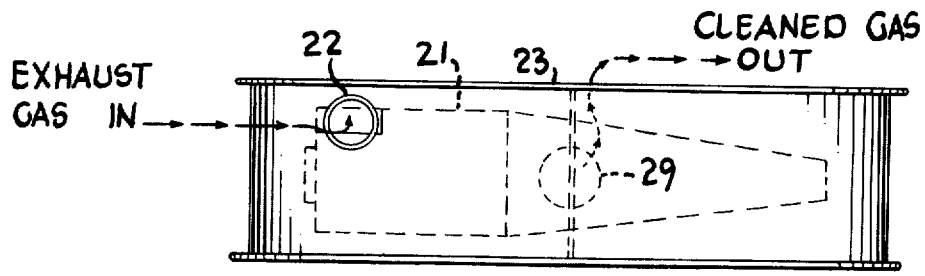
FIG. 5 is an end view of the embodiment of FIG. 4.

In the second embodiment shown in FIGS. 4 and 5 a fiber glass filter mat or paper 20 and an inertial separator 21 (a cyclone in this instance) are placed in a unitary housing 25. An automotive exhaust gas inlet 22 is provided and is in gas communication with the cyclone 21. The mat or paper 20 is convoluted and circular in shape to conform to the general circular shape of housing 25. The circular shaped mat is so dimensioned that it defines a gas space 23 inside the inner circumference of the circle formed by the mat 20 and a second gas space 24 is defined outside the circumference of the outer circle formed by the mat and the wall of housing 25. The cyclone 21 has positioned at the narrow or tapered end thereof a solids collector 28 for the solids discharged by the cyclone from the gas streams passing therethrough. An open pipe or effluent conduit 29 is provided in gas space 23 for the reception of gases passing through the mat or paper 20 and exits outside of the filter element 25. Gases from the cyclone 21 enter gas space 24 through an outlet 26 located at the wide end of the cyclone 21.

In the operation of the lead particulate removal system of FIGS. 1, 2 and 3, the gases to be treated are passed into the system through inlet conduit 3 which is typically a part of the exhaust gas discharge system of an automobile. The particulate in the gas entering the cyclone 1 are forced in a travel path in gas space or chamber 13 into the collection box 2. Gas chamber 13 is defined by the outer wall of the cyclone 1 and the outer wall of the gas conduit 14 contained in and centrally disposed in the cyclone 1. A sealing plate 15 is positioned across the forward end of the cyclcone 1 and serves to mount the inner conduit 14 centrally in the main cyclone chamber 13 and to seal chamber 13 from chamber 11. Gas conduit 14 is in open communication with the interior of collector 2 and gas chamber 11. Thus the gases entering the chamber 13 pass in circular fashion around the tapered cyclone throwing the particulates against the wall and downward into the collector 2. The gases then are turned around and passed out of collector 2 and into chamber 11 through conduit 14 located in front of the baffle 4. The gases as they pass into chamber 11 are turned by the bifurcated baffle member 4 in two directions. Chamber 11 is sealed by plates 8 and 9 forming an airtight chamber except for the mat or paper 6. Thus, the gases entering the chamber 11 are forced through the mat or paper 6 and into chamber 17 all around the paper 6. The particulates contained in the gas stream entering chamber 11 are thus removed prior to the gas entering gas zone 17. The cleaned gas substantially devoid of particulates is then removed from the system through the exhaust conduit 7 where they are passed into the atmosphere.

In the construction of the system shown in FIGS. 1, 2 and 3 various modifications may be made to permit more convenient operation. Thus, the bottom of the collector box 2 can be provided with a bolted plate secured at one end with a wing nut so that the collector can be emptied at set intervals of time or mileage during normal automotive maintenance or insepection periods. The filter 5 can be constructed so that it may operate for a convenient set period of time or mileage and thrown away, or the top of the filter 5 can be made removable so that the fiber glass mat 6 can be replaced at certain mileage intervals such as 10,000, 20,000, 30,000, 40,000 or 50,000 miles.

The fiber glass mat or paper 6 may be composed of a mat of glass fibers ranging in size from sub-micron to many microns in diameter. Thus, fibers or strands of fibers are typically provided with a suitable binder to permit the finished mat to withstand gas operating temperatures through the filter at least as high as 500°F. Preferably the gases passed through the filter are controlled in temperature to provide an inlet gas temperature across the mat of 500°F. or less.

A particularly acceptable binder for this purpose is a benzophenone dianhydride-metaphenylene diamine reaction product in a solvent of ethanol-N-methyl-2-pyrrolidone on a 30 to 70 percent volume basis ethanol to N-methyl pyrol. Other solvents for the reaction product used may be dimethylacetamide, dimethylforamamide, dimethylsulfoxide and pyridine. In lieu of metaphenylenediamine other aromatic diamines such as 4,4-diaminophenyl ether may be used.

In applying the binder to the fiber glass the reaction product of the dianhydride diamine in its carrier solvent is made water soluble by adding it to or adding to it, water containing a member of the group consisting of alkali metal hydroxides and ammonium hydroxide. Typical alkali metal hydroxides are sodium, potassium and lithium hydroxide. Ammonium hydroxide is preferred. Thus, in the preferred embodiment a benzophenone dianhydride-metaphenylene diamine reaction product in ethanol-N-methyl-2-pyrrolidone solvent is added to an aqueous ammonium hydroxide solution. Typically on a weight basis the solution is about 1 percent ammonium hydroxide and the dianhydride-diamine with its solvent media is about 8 percent.

The fiber glass fibers are slurried and vacuum drawn on conventional paper making equipment to form the fiber glass paper. After drying, the fiber glass paper is dipped in the aqueous solution containing the high temperature polyimide prepolymer binder and subsequently dried. The fiber glass paper is normally folded in the desired shape prior to application of the binder. Thus, in the preferred preparation, the fiber glass paper to be used in the filter element is folded in the shape shown in the drawing and dipped in the ammoniacal water solution containing the dianhydride-diamine reaction product. After thorough wetting the paper is dried, typically in an oven at about 300°F. for one hour. The fiber glass filter paper is then cured at 600°F. for about 4 hours to form a strongly adherent polyimide binder on the fiber glass in the paper. While it is preferred to operate the process of applying binder from an aqueous solution, this is not a critical feature of application since the organic solvents in which the dianhydride-diamine reaction product are present may also be used as the vehicle to apply the binder to the fiber glass. Water solutions are preferred because of the ease of handling, the ability to uniformly apply the binder and the safety involved in its use over solvents which may be noxious or flammable.

The inertial separators in the system shown in both embodiments herein described are cyclones. These are convenient types of inertial separators since they require a small amount of space and are highly efficient in separating large particulates from high velocity gas streams. The particulates typically removed from the exhaust gas system in cyclones 1 and 21 of the illustrated embodiments are typically greater than 2 microns in size. Thus, normal positioning of the particulate trap system a sufficient distance from the exhaust manifold of the engine of the automobile will provide gas temperatures of gases entering the inertial separator 1 of 700°F. or lower. Normally, during passage through the inertial separators a sufficient distance and residence time are provided for the gases to reduce the temperature of gas stream exiting the inertial separator to provide gases which pass across the filter mat or paper 6 having temperatures of 500°F. or less.

It is found in operating filters of the absolute type described by the instant invention that gas temperatures should be in the neighborhood of 500°F. or less for effective filtration.

In a particular embodiment of the instant invention, automotive exhaust gases from an internal combustion engine operating on a 1969 four-door Bonneville sedan were passed through the exhaust gas filtering system of the type shown in FIG. 3 and 4. The exhaust manifold on the engine was connected to fluted exhaust pipes which provided a sufficient length and heat exchange during operation of the automobile to reduce the temperatures of the gases entering the gas exhaust inlet 22 to a temperature of below 500°F. The gas was passed through the cyclone 21 and large particulates were deposited in the collection chamber 28. The gas was then passed through the outlet 27 of the cyclone and across and into chamber 24. These exhaust gases had temperatures below 500°F. and were then passed across the filter mat 20 located in the housing 25 of the filter system. The gases then entered chamber 23 and were passed through exhaust gas outlet 29 to the atmosphere. The exiting gases from the exhaust gas system had attained a temperature of below 500°F. Tests involving passing exhaust gases from outlet 29 through a further final absolute filter uncovered essentially no lead present in the gases in pipe 29.

While the emphasis has been placed upon the removal of lead particulates from exhaust gases, the filter unit and method herein described is useful in removing any particulates found in the exhaust system in the size range of 0.3 micron or greater. Thus, engine deposits, catalyst particles from catalyst mufflers and other like materials are removed with the lead particulates. The filter unit is also found to muffle sound effectively and serves also as an effective muffler element in an automotive exhaust system.

While the invention has been described with reference to certain specific embodiments illustrated, it is for illustrative purposes only and is not to be construed as limiting the invention except insofar as appears in the accompanying claims.

We claim:

1. In an exhaust gas filter device for automotive exhaust gases the combination comprising:
   an exhaust gas conduit means,
   a housing in gas communication with said exhaust gas conduit means,
   a pleated fiber glass paper barrier having a binder which binds fibers to each other thereon capable of withstanding 500°F., said fiber glass paper barrier being of annular configuration and positioned within said housing to provide a first gas chamber defined by the outer surface of said glass fiber paper barrier and the inside wall of said housing and a second gas chamber defined by the inside of said paper and the floor and ceiling of said housing;
   an inertial centrifugal gas separator positioned within said housing and within said first gas chamber,
   means connected to said housing for introducing exhaust gases into said first gas chamber,
   means connected to said housing in said second gas chamber to remove gases to a point outside of said housing.

2. The apparatus of claim 1 having means provided in said housing to remove particulates collected by said inertial gas separator.

3. The apparatus of claim 1 having a baffle means positioned in said first gas chamber to circulate the gases throughout said first chamber after passing through said inertial gas separator.

4. The apparatus of claim 2 wherein said inertial gas separator is a cyclone separator.

* * * * *